United States Patent
Desai et al.

(10) Patent No.: US 8,682,246 B2
(45) Date of Patent: Mar. 25, 2014

(54) METHOD AND SYSTEM FOR COLLABORATIVE COEXISTENCE OF BLUETOOTH AND WIMAX

(75) Inventors: Prasanna Desai, Olivenhain, CA (US); Steven Deane Hall, Olivenhain, CA (US); Brima Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1136 days.

(21) Appl. No.: 11/845,481

(22) Filed: Aug. 27, 2007

(65) Prior Publication Data

US 2008/0233875 A1 Sep. 25, 2008

Related U.S. Application Data

(60) Provisional application No. 60/896,242, filed on Mar. 21, 2007.

(51) Int. Cl.
*H04B 7/00* (2006.01)
*H04B 1/00* (2006.01)

(52) U.S. Cl.
USPC ....... 455/41.2; 455/41.1; 455/41.3; 455/63.1; 455/114.2; 455/278.1; 455/296

(58) Field of Classification Search
USPC .................. 455/41.1, 41.2, 41.3, 63.1, 114.2, 455/278.1, 296
See application file for complete search history.

(56) References Cited

U.S. PATENT DOCUMENTS

| | | | |
|---|---|---|---|
| 2002/0061031 A1* | 5/2002 | Sugar et al. | 370/466 |
| 2003/0162549 A1* | 8/2003 | Carlsson | 455/456 |
| 2004/0029619 A1* | 2/2004 | Liang et al. | 455/562.1 |
| 2004/0224708 A1* | 11/2004 | Brabenac | 455/502 |
| 2006/0098570 A1* | 5/2006 | Hadad | 370/210 |
| 2007/0121740 A1* | 5/2007 | Gallagher | 375/260 |
| 2007/0135162 A1* | 6/2007 | Banerjea et al. | 455/556.1 |

(Continued)

OTHER PUBLICATIONS 802.15.2, IEEE Recommended Practice for Information Technology—Telecommunications and Information Exchange Between Systems—Local and Metropolitan Area Networks—Specific Requirements, Part 15.2: Coexistence of Wireless Personal Area Networks with Other Wireless Devices Operating in Unlicensed Frequency Bands, IEEE Computer Society, Aug. 28, 2003, pp. 1-115.

*Primary Examiner* — Wen Huang
(74) *Attorney, Agent, or Firm* — Thomas | Horstemeyer, LLP

(57) ABSTRACT

Methods and systems for collaborative coexistence of Bluetooth and WiMax are disclosed. Aspects of one method may include a packet traffic arbiter (PTA) in a mobile terminal that arbitrates among requests to transmit from one or more communication devices collocated in the mobile terminal. The communication devices may comprise, for example, a WLAN communication device, a WiMax communication device, and/or a Bluetooth communication device. The arbitration may be based on, for example, whether a packet will be received by one of the plurality of collocated communication devices at a time of transmission of the present data packet and/or a priority for data to be transmitted. An exemplary scenario may be where a Bluetooth headset may be used for communication over a WiMax voice connection. One arbitration method may comprise allowing the WiMax packet to be transmitted, and replacing the received Bluetooth packet with data indicating silence. Another method may comprise not allowing transmission of the present WiMax packet. Rather, the present WiMax packet and a subsequent WiMax packet may e transmitted at the next transmission period.

24 Claims, 11 Drawing Sheets

(56) References Cited

U.S. PATENT DOCUMENTS

| | | | |
|---|---|---|---|
| 2007/0275746 A1* | 11/2007 | Bitran | 455/509 |
| 2008/0139212 A1* | 6/2008 | Chen et al. | 455/450 |
| 2008/0205365 A1* | 8/2008 | Russell et al. | 370/341 |
| 2009/0003307 A1* | 1/2009 | Yang et al. | 370/350 |

* cited by examiner

METHOD AND SYSTEM FOR COLLABORATIVE COEXISTENCE OF BLUETOOTH AND WIMAX

CROSS-REFERENCE TO RELATED APPLICATIONS/INCORPORATION BY REFERENCE

This application makes reference to, claims priority to, and claims benefit of U.S. Provisional Application Ser. No. 60/896,242 filed Mar. 21, 2007.

The above stated application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to communication networks. More specifically, certain embodiments of the invention relate to a method and system for collaborative coexistence of Bluetooth and WiMax.

BACKGROUND OF THE INVENTION

A wireless communication device may communicate using more than one standard. For example, a wireless communication device may use IEEE 802.1x standard for Wireless Local Area Network (WLAN) and/or Worldwide Interoperability for Microwave Access (WiMax) communication, and Bluetooth Special Interest Group (SIG) specification for Bluetooth communication. In order to alleviate signal interference from sharing a radio frequency (RF) spectrum with other communication systems, the Bluetooth standard allows frequency hopping where information is transmitted at various frequencies. In this manner, the energy of the transmitted signal is spread across the RF spectrum in 79 channels with each channel separated by 1 MHz, between 2.402 GHz and 2.480 GHz. The Bluetooth standard allows 1600 frequency hops per second.

The advantage of the frequency hopping system is that it spreads information across a wide band of frequencies. Therefore, signals transmitted by other systems using a portion of the same frequency spectrum may appear as noise to only some of the frequencies used by Bluetooth in frequency hopping. Similarly, only a portion of Bluetooth transmission may interfere with signals transmitted by other systems. However, there may still be packets that may be corrupted due to collisions with packets transmitted by one or more collocated radios.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for collaborative coexistence of Bluetooth and WiMax, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
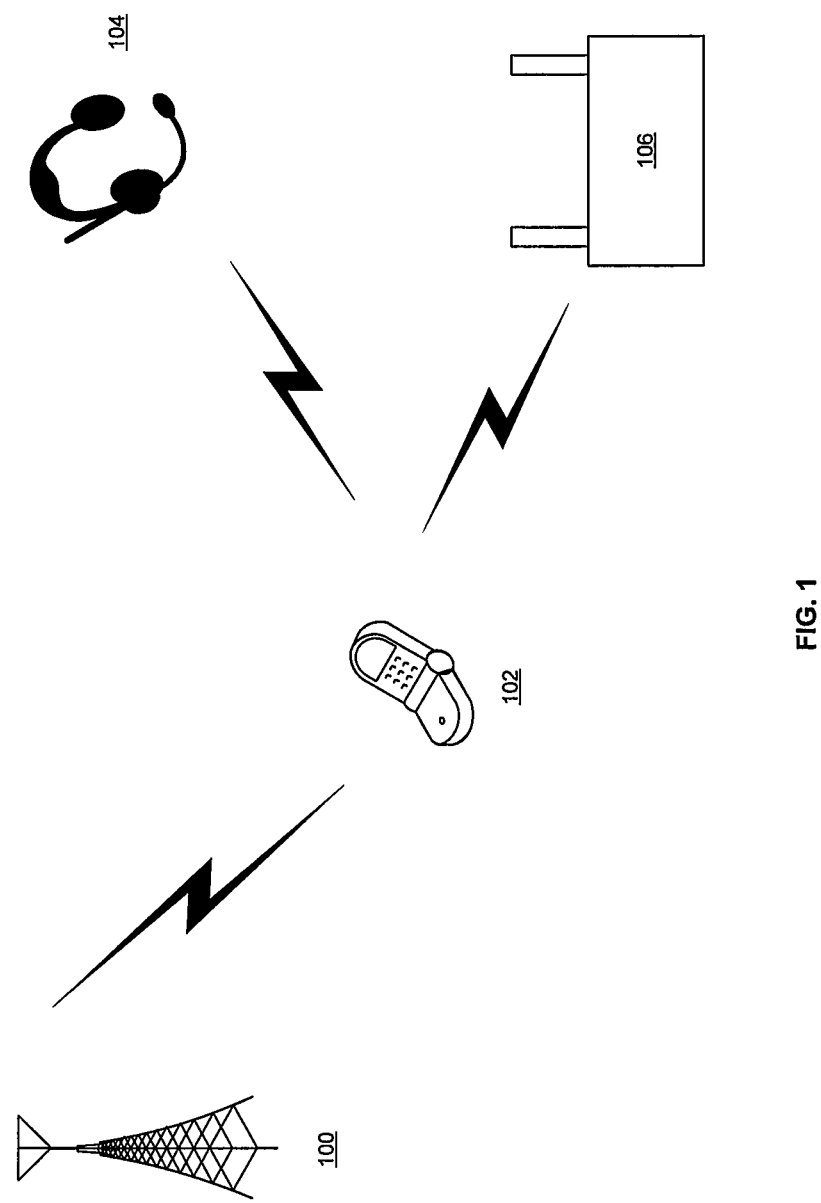
FIG. 1 is a diagram of an exemplary system for wireless communication using a plurality of wireless communication protocols, in accordance with an embodiment of the invention.

Certain embodiments of the invention may be found in a method and system for collaborative coexistence of Bluetooth and WiMax. Aspects of the invention may comprise a mobile terminal that comprises a plurality of collocated communication devices. The mobile terminal may make predictions of whether transmission and/or reception by one of the collocated communication devices may result in a collision with transmission and/or reception by another of the collocated communication devices. The collocated communication devices may comprise a WiMax communication device and a Bluetooth communication device. The collocated communication devices may also comprise a WLAN communication device. The mobile terminal may arbitrate among the collocated communication devices to grant permission to transmit to a subset of the collocated communication devices. The subset of the collocated communication devices may range from none of the collocated communication devices to all of the collocated communication devices.

The arbitration may be based on predictions of collision and any transmit requests from the collocated communication devices. The arbitrating may also be based on priorities assigned to a type of packet to be transmitted by the collocated communication devices that make the transmit requests. The arbitration may result in granting permission to a subset of the collocated communication devices to transmit if a collision is not predicted. A transmit request may be received from the WiMax communication device, where the WiMax communication device may transmit packets comprising data that correspond to data received from the Bluetooth communication device. In various embodiments of the invention, an algorithm may be used where if a collision is predicted with an incoming Bluetooth packet, data that indicates silence may be transmitted as part of the WiMax packet that is transmitted after the WiMax packet that is predicted to cause the collision is transmitted.

Various embodiments of the invention may also use an algorithm where if a WiMax packet is predicted to cause a collision with an incoming Bluetooth packet, the WiMax packet may not be transmitted. The WiMax communication device may then make a request to a WiMax base station for permission to use a wider bandwidth for transmission at a next available WiMax transmission period. If the WiMax base station grants permission to use the wider bandwidth, it may transmit both the WiMax packet that was denied permission to transmit and a next WiMax packet using the wider bandwidth.

Various embodiments of the invention may also use an algorithm where a determination may be made whether a received Bluetooth packet may comprise voice data. If the received Bluetooth packet is determined to not comprise the voice data, the WiMax communication device may be granted permission to transmit a WiMax packet. However, if a next incoming Bluetooth packet is predicted to cause a collision, the WiMax packet that is to be transmitted that corresponds to the incoming Bluetooth packet may be provided with data that indicates silence.

If the received Bluetooth packet is determined to comprise voice data, and if a next incoming Bluetooth packet is predicted to cause a collision, the WiMax packet that is predicted to be in the collision may be denied permission to transmit. The WiMax communication device may then make a request to a WiMax base station to use a wider bandwidth for transmission at a next available WiMax transmission period. If permission for use of the wider bandwidth is received from the WiMax base station, the WiMax communication device may transmit both the WiMax packet that was denied permission to transmit and a next WiMax packet using the wider bandwidth.

FIG. 1 is a diagram of an exemplary system for wireless communication using a plurality of wireless communication protocols, in accordance with an embodiment of the invention. Referring to FIG. 1, there is shown a WiMax base station 100, a mobile terminal 102, a Bluetooth enabled headset 104, and a WLAN router 106.

The mobile terminal 102 may comprise suitable logic, circuitry, and/or code that may enable wireless communication to and/or from other electronic devices. The Bluetooth enabled headset 104 may comprise suitable logic, circuitry and/or code that may that may enable communicating with another Bluetooth enabled electronic devices. The WLAN router 106 may comprise suitable logic, circuitry and/or code that may enable an electronic device to communicate data to and/or from other electronic devices on a network.

The mobile terminal 102 may communicate with the WiMax base station 100 according to, for example, IEEE 811.16 standard. For example, the mobile terminal 102 may have set up a voice over IP (VoIP) connection using the WiMax network. The mobile terminal 102 may also be connected to the Bluetooth enabled headset 104 via a synchronous connection oriented connection according to, for example, IEEE 811.15 standard. Accordingly, the voice data received by the mobile terminal 102 via the WiMax base station 100 may be communicated to the Bluetooth enabled headset 104. Similarly, the user's voice may be transmitted to the mobile terminal 102 using the Bluetooth connection, and the user voice data may be communicated to the WiMax base station 100. Some embodiments of the invention may also enable the mobile terminal 102 to transfer data to and/or from a network via the WLAN router 106, according to, for example, IEEE 802.11 standard.

The Bluetooth packets to and/or from the mobile terminal 102 and the WiMax packets to and/or from the mobile terminal 102 may interfere with each other. For example, the power used by the mobile terminal 102 in transmitting WiMax packets may saturate a Bluetooth receiver front end. Similarly, transmitting Bluetooth packets may interfere with reception of WiMax packets. Bluetooth packets may be packets transmitted by Bluetooth devices, and WiMax packets may be packets transmitted by WiMax devices.

Figure 2A:
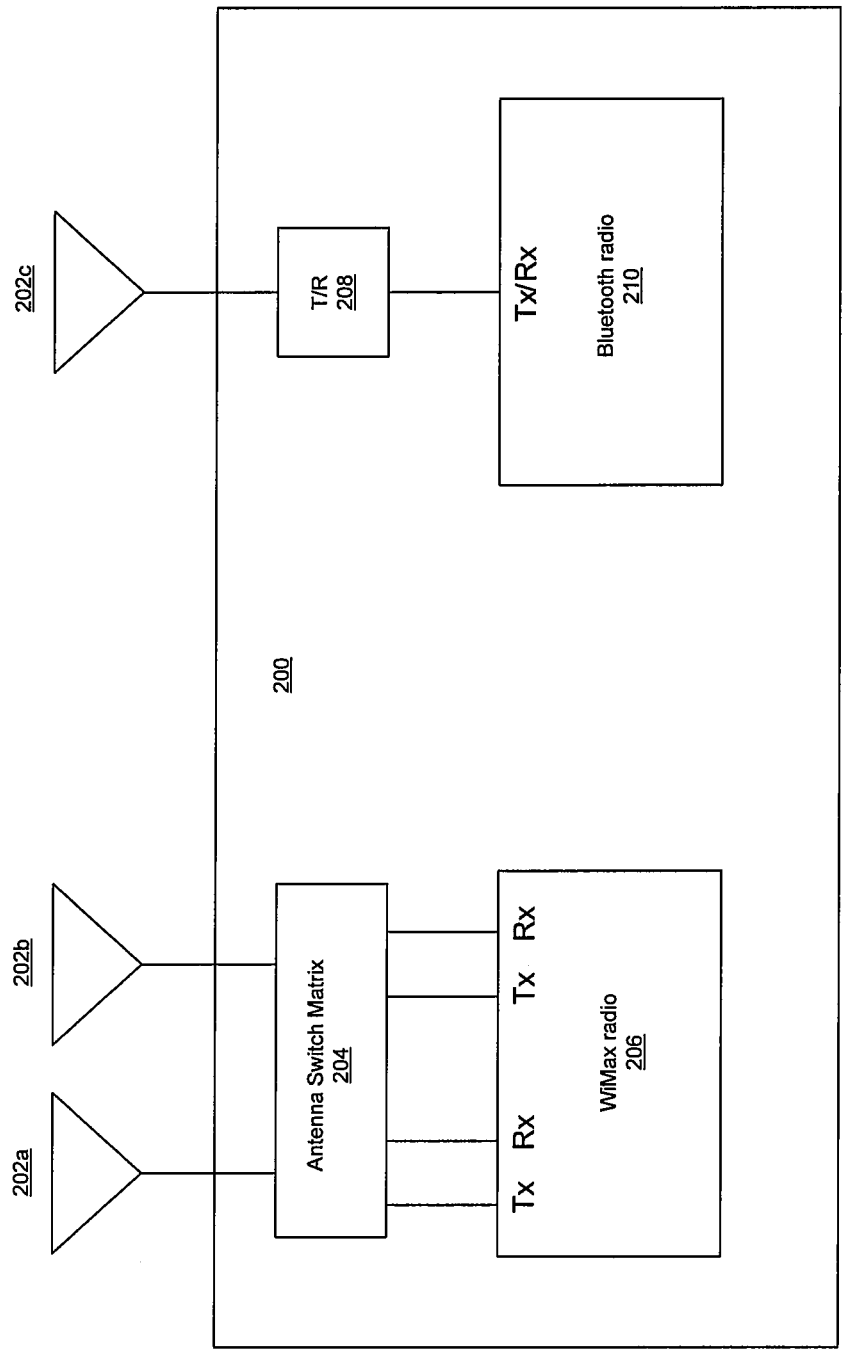
FIG. 2A is an exemplary block diagram illustrating a plurality of collocated radios for wireless communication, in accordance with an embodiment of the invention.

FIG. 2A is an exemplary block diagram illustrating a plurality of collocated radios for wireless communication, in accordance with an embodiment of the invention. Referring to FIG. 2A, there is shown a mobile terminal 200, which may comprise a plurality of antennas 202a, 202b, 202c, an antenna switching matrix 204, a WiMax radio 206, an antenna transceiver circuit 208, and a Bluetooth radio 210. For example, the WiMax signals may be communicated via the antennas 202a and 202b, while the Bluetooth signals may be communicated via the antenna 202c.

The antenna switching matrix 204 may comprise suitable logic, circuitry, and/or code that may allow signals to be communicated to the antennas 202a and 202b when the WiMax radio 206 is in a transmit mode, and receive signals from the antennas 202a and 202b when the WiMax radio 206 is in a receive mode. Similarly, the antenna transceiver circuit 208 may comprise suitable logic, circuitry, and/or code that may enable the Bluetooth radio 210 to communicate signals to the antenna 202c when the Bluetooth radio 210 is in a receive mode, and to receive signals from the antenna 202c when the Bluetooth radio 210 is in a receive mode.

The WiMax radio 206 and the Bluetooth radio 210 may each comprise suitable logic, circuitry, and/or code that may enable processing of baseband signals for transmission, and processing of received signals for user consumption and/or transmission.

For example, the WiMax radio 206 may process signals received from the antennas 202a and 202b, and the processed signals may be communicated to the Bluetooth radio 210. The Bluetooth radio 210 may further process the signals from the WiMax radio 206 for transmission via the antenna 202c. Similarly, the signals received via the antenna 202c may be processed by the Bluetooth radio 210 and the WiMax radio 206 for transmission via the antennas 202a and 202b.

While an exemplary antenna configuration may have been described with respect to FIG. 2A, the invention need not be so limited. For example, various embodiments of the invention may enable the WiMax radio 206 to use more than two antennas. Additionally, various embodiments of the invention may enable sharing one or more of the WiMax antennas for Bluetooth communication.

Figure 2B:
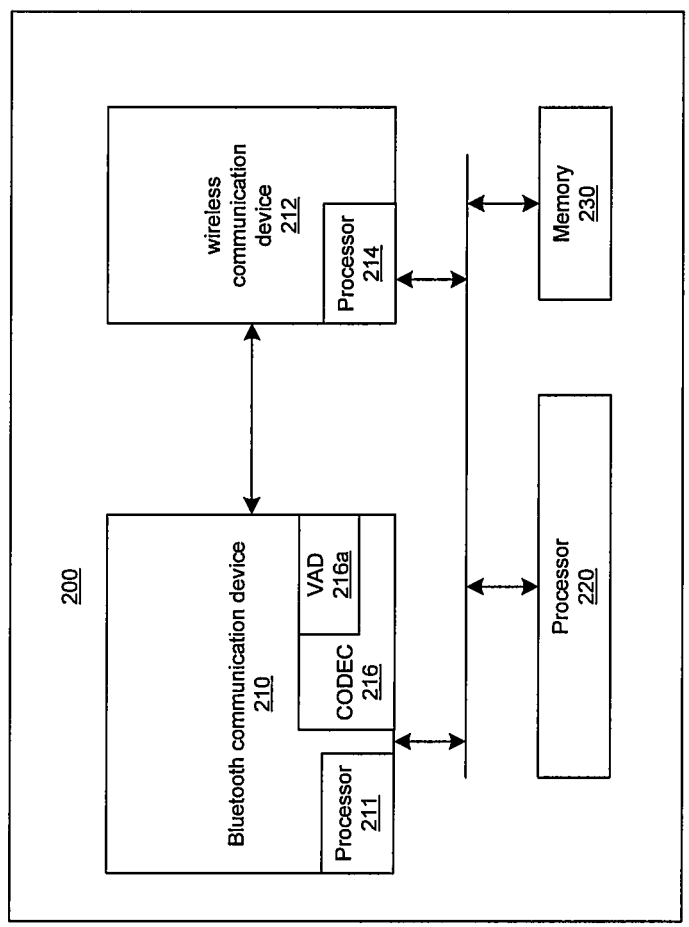
FIG. 2B is an exemplary block diagram illustrating a Bluetooth device collocated with another wireless device, in accordance with an embodiment of the invention.

FIG. 2B is a block diagram illustrating a Bluetooth device collocated with another wireless device, in accordance with an embodiment of the invention. Referring to FIG. 2B, there is shown the mobile terminal 200. The mobile terminal 200 may comprise a Bluetooth communication device 210, a wireless communication device 212, such as, for example, a WLAN device and/or a WiMax device, a processor 220, and memory 230. The Bluetooth communication device 210 may comprise, for example, the Bluetooth radio 210, which may comprise suitable logic, circuitry and/or code that may enable communication of data, command and/or status with other Bluetooth devices. The Bluetooth communication device 210 may comprise a processor 211 that may be used, for example, to control Bluetooth transmission and/or reception, and a coder/decoder (CODEC) 216. The CODEC 216 may be used to encode voice data for transmission, and also to decode received voice data. The CODEC 216 may also comprise, for example, a voice activity detector (VAD) 216a. The VAD 216a may comprise suitable logic, circuitry and/or code that may enable determining whether data may comprise voice data. The algorithm used by the VAD 216a for voice determination may be design dependent.

The wireless communication device 212 may comprise the WiMax radio 206, which may comprise suitable logic, circuitry and/or code that may enable communication of data, command and/or status with other wireless communication devices. The wireless communication device 212 may also comprise a processor 214. The processor 214 may be used, for example, to control WiMax transmission and/or reception. The processor 220 may comprise suitable logic, circuitry and/or code that may enable communication and/or reception of data, command and/or status for the Bluetooth communication device 210 and the wireless communication device 212. The memory 230 may comprise may comprise suitable logic and/or circuitry that may enable storage of information, such as, for example, data and/or code, that may be used by other devices.

The mobile terminal 200 may communicate with other Bluetooth devices via the Bluetooth communication device 210, and connect to a communication network via the wireless communication device 212. An application that transmits via the Bluetooth communication device 210 may be a different application than the application that is accessing the wireless network via the wireless communication device 212. Accordingly, transmission by communication devices 210 and 212 may not be coordinated with respect to when each may transmit.

Figure 3A:
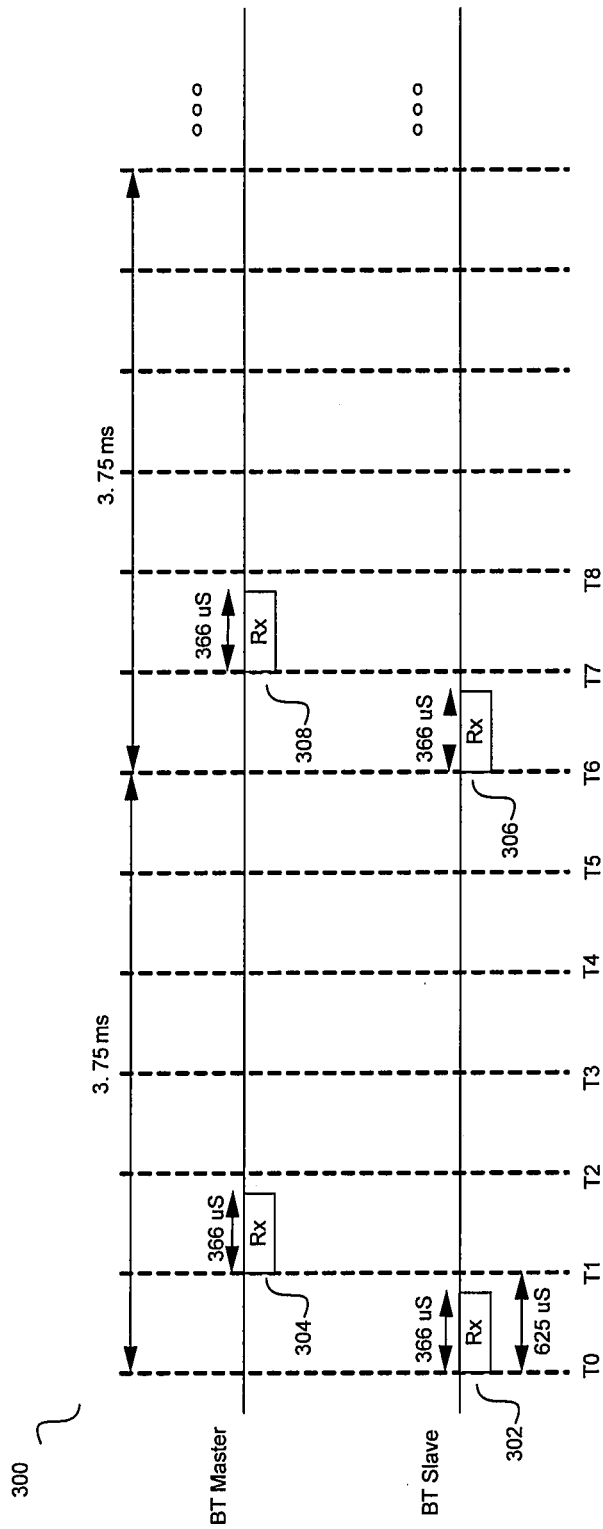
FIG. 3A is a diagram of exemplary Bluetooth packet reception, which may be used in connection with an embodiment of the invention.

FIG. 3A is a diagram of exemplary Bluetooth packet reception, which may be used in connection with an embodiment of the invention. Referring to FIG. 3A, there is shown an exemplary diagram 300 of Bluetooth reception by a Bluetooth master device and a Bluetooth slave device, such as, for example, the mobile terminal 102 and the Bluetooth enabled headset 104. The Bluetooth slave device may receive a packet 302 transmitted by the Bluetooth master device at a time instance T0. The Bluetooth slave device may respond by transmitting a packet 304 at a time instance T1. The Bluetooth master device may receive the packet 304 from the Bluetooth slave device. The period of time from the time instance T0 to the time instance T2 may be, for example, a Bluetooth frame, where there may be 3 distinct Bluetooth frames. Accordingly, a Bluetooth master device and a Bluetooth slave device may generally communicate every 3.75 milliseconds (mS).

Figure 3B:
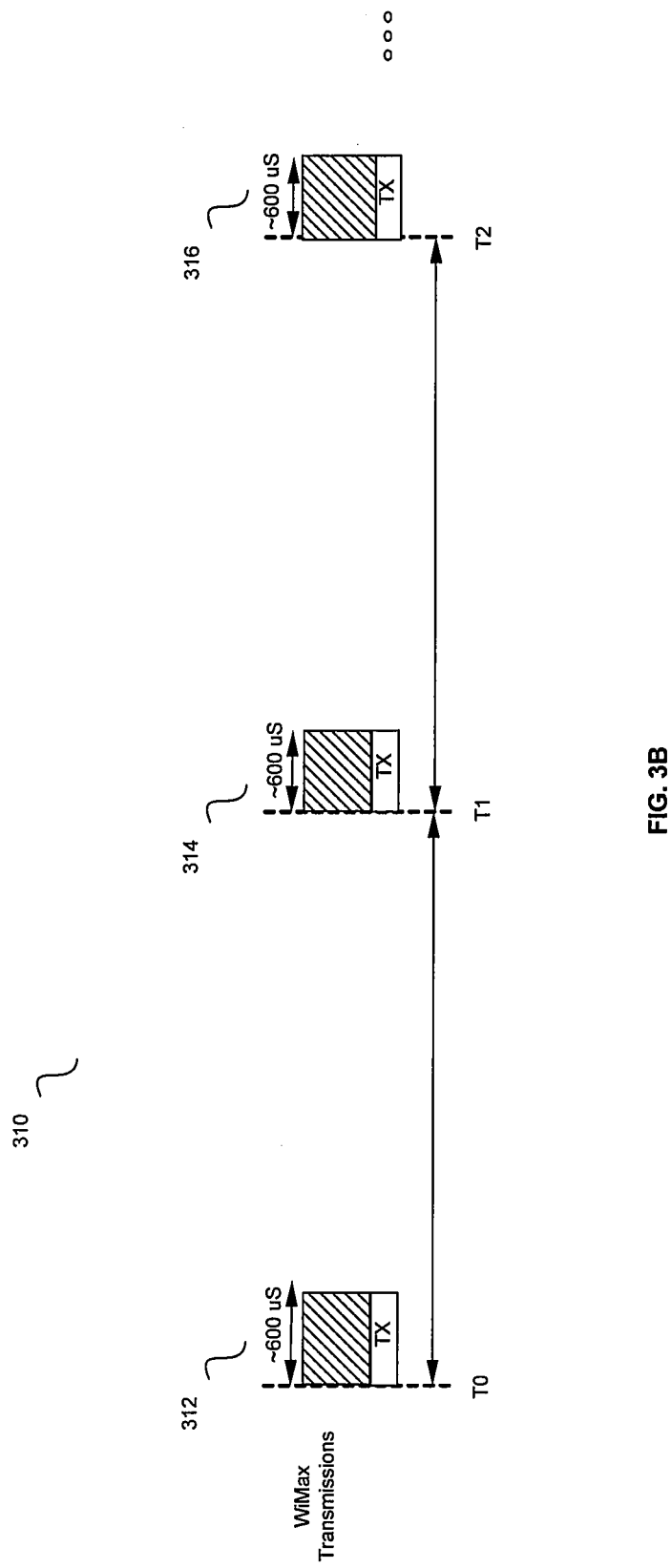
FIG. 3B is a diagram of exemplary WiMax packet transmission, which may be used in connection with an embodiment of the invention.

FIG. 3B is a diagram of exemplary WiMax packet transmission, which may be used in connection with an embodiment of the invention. Referring to FIG. 3B, there is shown a diagram 300 of WiMax packets 312, 314, and 316. The packets 312, 314, and 316 may be transmitted, for example, 40 mS apart for voice over IP (VoIP) applications. However, a WiMax provider may also determine, for example, that more frequent transmissions may provide better quality for VoIP calls. Accordingly, the WiMax provider may allow a shorter period than 40 mS for transmission by a handset, such as, for example, the mobile terminal 102.

The mobile terminal 102 may use, for example, real time polling system (rtPS) and extended rtPS (ertPS) protocol to transmit variable size packets for VoIP data. Accordingly, the mobile terminal 102 may request different bandwidths for different transmissions.

Figure 3C:
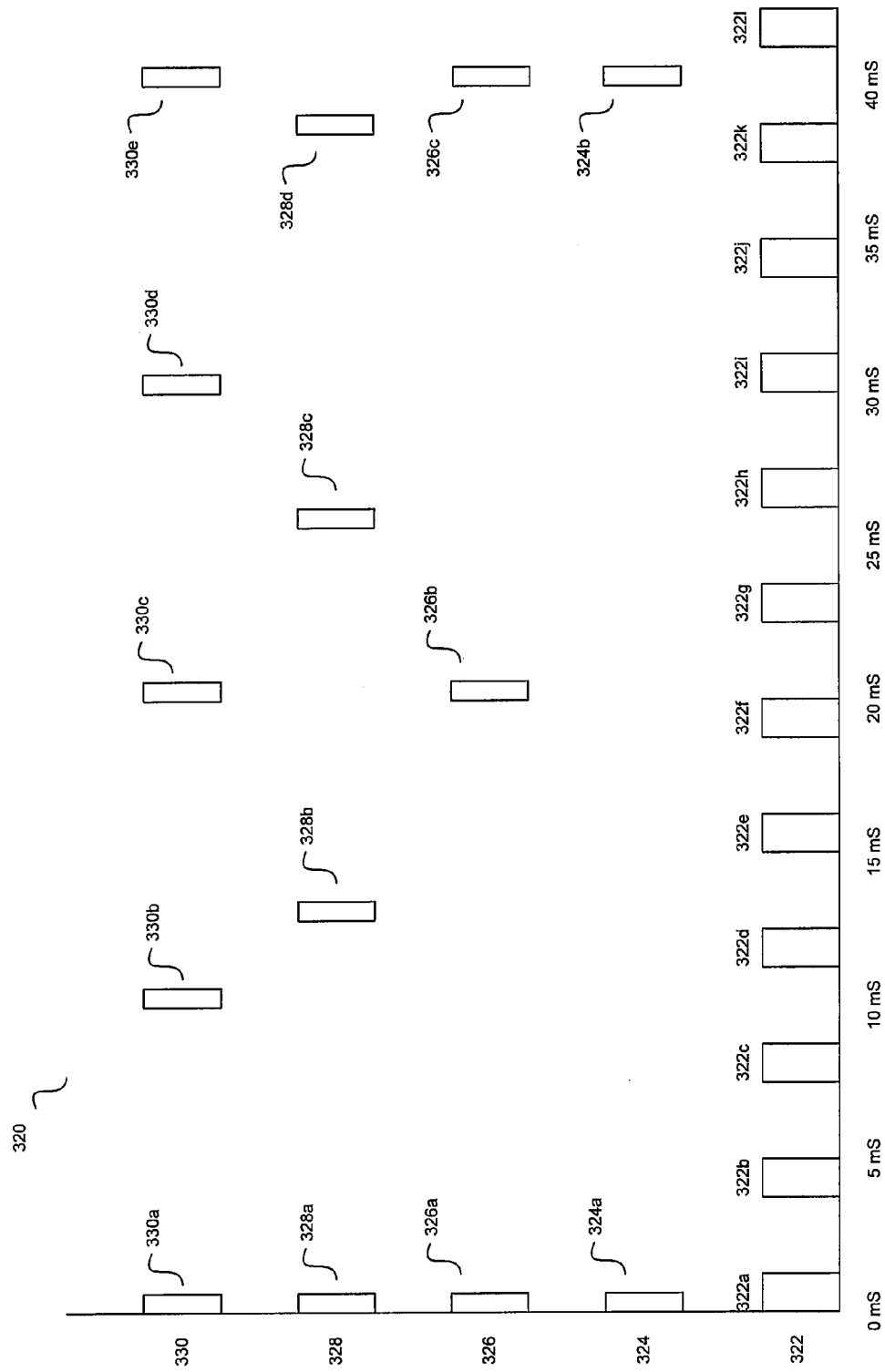
FIG. 3C is a diagram illustrating interference between WiMax packets and Bluetooth packets, which may be used in connection with an embodiment of the invention.

FIG. 3C is a diagram illustrating interference between WiMax packets and Bluetooth packets, which may be used in connection with an embodiment of the invention. Referring to FIG. 3C, there is shown a diagram 320 that illustrates collision between Bluetooth packets and non-Bluetooth packets, such as, for example, WiMax packets and/or WLAN packets. For example, the diagram portion 322 comprises a series of Bluetooth packets 322a . . . 322l at 3.75 mS intervals. The diagram portions 324, 326, 328, and 330 comprise a series of, for example, WiMax packets at different time intervals.

For example, the diagram portion 324 comprises WiMax packets 324a and 324b that may be, for example, 40 mS apart. The diagram portion 326 comprises WiMax packets 326a, 326b, and 326c that may be, for example, 20 mS apart. The diagram portion 328 comprises WiMax packets 328a, 328b, 328c, and 328d that may be, for example, 13 mS apart. The diagram portion 330 may comprise WiMax packets 330a, 330b, 330c, 330d, and 330e that may be, for example, 10 mS apart. As WiMax packets are transmitted closer together in time, chances of collisions between the WiMax packets and the Bluetooth packets may increase.

Figure 4:
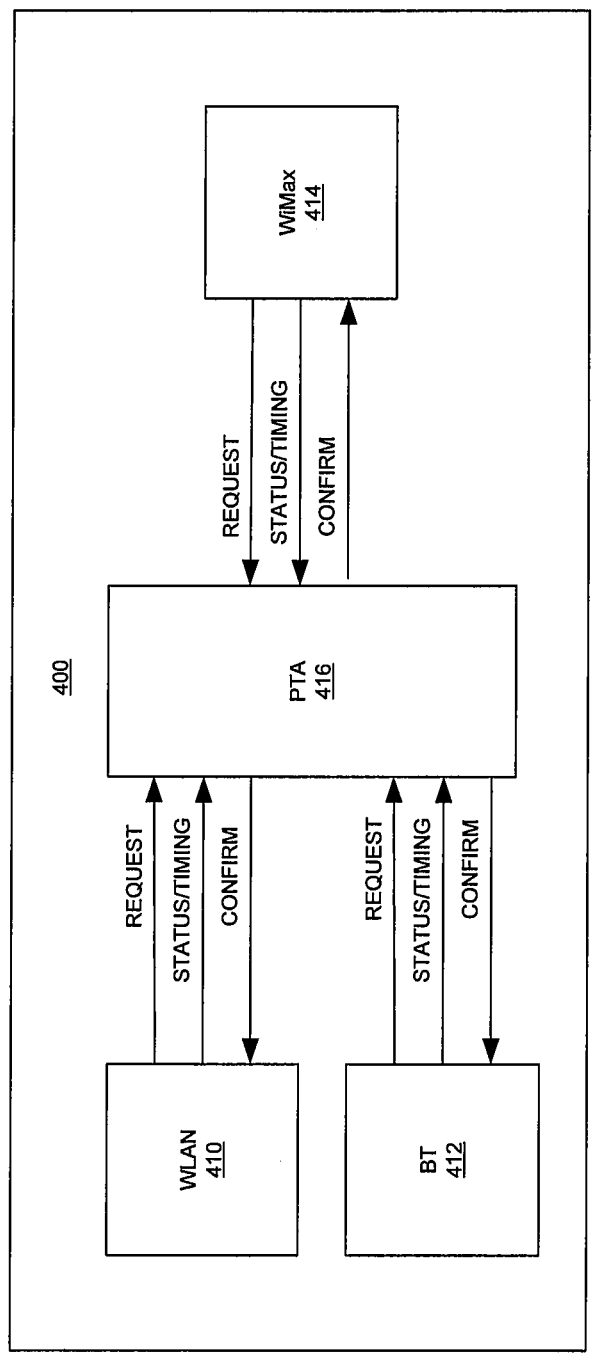
FIG. 4 is a block diagram illustrating an exemplary coexistence interface, in accordance with an embodiment of the invention.

FIG. 4 is a block diagram illustrating an exemplary coexistence interface, in accordance with an embodiment of the invention. Referring to FIG. 4, there is shown the mobile terminal 400, which may be similar to the mobile terminal 102, comprising a WLAN communication device 410, a Bluetooth communication device 412, a WiMax communication device 414, and a packet traffic arbiter (PTA) 416. The Bluetooth communication device 412 may be similar, for example, to the Bluetooth communication device 210.

The PTA 416 may comprise suitable logic, circuitry, and/or code that may allow arbitration of a plurality of communication devices that may request permission to transmit. The arbitration may depend, for example, on transfer of information from the WLAN communication device 410, the Bluetooth (BT) communication device 412, and the WiMax communication device 414 to and from the PTA 416 via a collaborative coexistence interface, where the interface may comprise, for example, three signals. The collaborative coexistence interface may comprise, for example, a transmit-request signal REQUEST, a status signal STATUS/TIMING, and a transmit-confirm signal CONFIRM.

The WLAN communication device 410, the Bluetooth communication device 412, and the WiMax communication device 414 may control the transmit-request signal REQUEST and the status signal STATUS/TIMING in their respective collaborative coexistence interfaces. The PTA 416 may control the transmit-confirm signal CONFIRM to each of the WLAN communication device 410, the Bluetooth communication device 412, and the WiMax communication device 414.

The transmit-request signal REQUEST may be asserted when a communication device wishes to transmit a packet after a given period of time. The period of time may be design dependent. The status signal STATUS/TIMING may be used to signal a priority of the packet that may be transmitted by the communication device that is asserting the transmit-request signal REQUEST. For example, status signal STATUS/TIMING may indicate whether the packet to be transmitted may have a low priority or a high priority. Other embodiments of the invention may use different number of priority statuses, including all packets having the same priority. The priority for a data to be transmitted may be determined, for example, by the type of data. For example, those transmissions that are required, such as status and/or commands, for a protocol may have, for example, a higher priority than data packets. Also, packets that are smaller and transmitted more often may have, for example, a lower priority than larger packets that are transmitted less often. The decision may also take into account predictions of packets to be received, and therefore, whether there may be possible collisions between the packet to be transmitted and the packet to be received.

The status signal STATUS/TIMING may also indicate, for example, timing information as to when the packet to be transmitted may be transmitted. This information may be used by the PTA 416 to determine whether there may be a collision, for example, with an incoming packet. The PTA 416 may receive these signals from one or more communication devices. Accordingly, an arbitration algorithm may determine which transmit-confirm signal CONFIRM, if any, may be asserted based on which packet may have a higher priority. For example, the Bluetooth communication device 412 may have established an enhanced synchronous connection oriented (eSCO) link or an asynchronous connectionless link (ACL) with another Bluetooth device such as, for example, the Bluetooth enabled headset 104. If the PTA 416 predicts that there may be a collision between, for example, transmission of a packet by the WiMax communication device 414 and reception of a Bluetooth packet by the Bluetooth communication device 412, the PTA 416 may allow the WiMax communication device 248 to transmit. This may, for example, occur in instances where eSCO packets and ACL packets may be retransmitted, and the Bluetooth enabled headset 104 may have buffered packets to enable retransmission.

The PTA 416 may be able to determine when a Bluetooth synchronous connection oriented (SCO) packet may be received in the future by monitoring, for example, signals that may be communicated to the PTA 416 by the Bluetooth communication device 412. For example, the Bluetooth communication device 412 may assert the transmission request signal REQUEST every 3.75 mS while the SCO connection is in place. Accordingly, the PTA 416 may also be able to predict when the next Bluetooth packet may be transmitted.

Additionally, the PTA 416 may have been communicated the type of Bluetooth link for specific Bluetooth frames and whether the Bluetooth communication device 412 may be a slave device or a master device by, for example, a processor such as the processor 211, the processor 214, and/or the processor 220. Accordingly, the PTA 416 may be able to determine whether a Bluetooth packet may be received by the Bluetooth communication device 412 before or after a packet transmission by the Bluetooth communication device 412. This may occur in instances where a Bluetooth slave device may transmit in response to a packet from a Bluetooth master device.

The PTA 416 may also be communicated by the Bluetooth communication device 412 whether a most recently received Bluetooth packet may comprise voice data. Whether the Bluetooth packet may comprise voice data may be determined, for example, by the VAD 216a. This information may be used, for example, by the PTA 416 for arbitration purposes, as discussed with respect to FIG. 7.

The PTA 416 may also have received the asserted transmission request signal REQUEST previously from the WiMax communication device 414. Based on the history of the previous assertions of the transmission request signal REQUEST by the WiMax communication device 414, the PTA 416 may be able to project when the WiMax communication device 414 may make a transmission request. The prediction algorithm, and the arbitration algorithm used by the PTA 416 may be design dependent.

While a specific scenario may have been described above with respect to transmit arbitration, arbitration may also apply to other transmit-receive, receive-transmit, and transmit-transmit scenarios involving two or more communication devices. Furthermore, while the PTA 416 may have been described as being communicated information by, for example, the Bluetooth communication device 412 and/or a processor, the invention need not be so limited. For example, other embodiments of the invention may allow the PTA 416 to read, for example, memory locations that may be written by various components, such as, for example, the Bluetooth communication device 412 and/or a processor.

While a collaborative coexistence interface using three signals may have been described, the invention need not be so limited. For example, other embodiments of the invention may use 2 signals, or 4 signals, etc.

Figure 5:
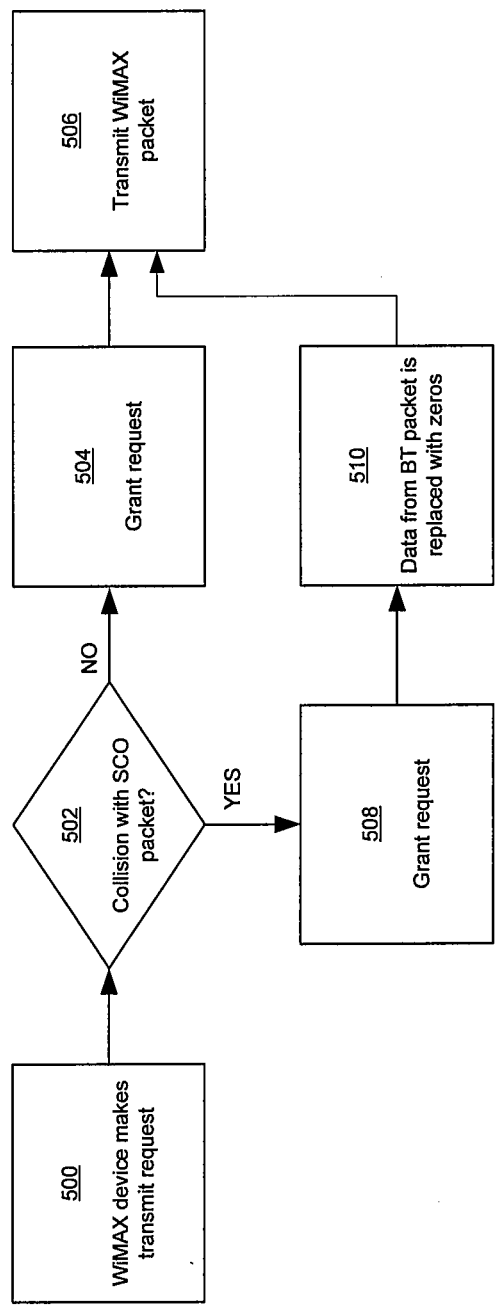
FIG. 5 is a flow diagram illustrating exemplary steps for handling an anticipated collision between a WiMax packet to be transmitted and a Bluetooth packet to be received, in accordance with an embodiment of the invention.

FIG. 5 is a flow diagram illustrating exemplary steps for handling an anticipated collision between a WiMax packet to be transmitted and a Bluetooth packet to be received, in accordance with an embodiment of the invention. Referring to FIG. 5, there is shown steps 500 to 510 for an exemplary scenario where the mobile terminal 102 may have established a VoIP connection via the WiMax base station 100. The mobile terminal 102 may also have established a Bluetooth SCO connection with, for example, the Bluetooth enabled headset 104. Accordingly, the voice data received from the WiMax base station 100 by the mobile terminal 102 may be communicated to the Bluetooth enabled headset 104, and vice versa.

In step 500, the WiMax communication device 414 may assert the transmission request signal REQUEST. The WiMax communication device 414 may also indicate, for example, via the status signal STATUS/TIMING when a packet may be transmitted and/or a priority of the packet. In step 502, the PTA 416 may determine, for example, whether allowing the WiMax communication device 414 to transmit may result in a collision with an incoming Bluetooth packet. If there is no predicted collision, the next step may be step 504. Otherwise, the next step may be step 508. In step 504, the PTA 416 may indicate to the WiMax communication device 414 that it may transmit a present WiMax packet by asserting the transmit-confirm signal CONFIRM. In step 506, the WiMax communication device 414 may transmit the present WiMax packet, where the WiMax packet payload may comprise voice data from one or more previous Bluetooth packets transmitted by the Bluetooth enabled headset 104.

In step 508, the PTA 416 may also indicate that the WiMax communication device 414 may transmit the present WiMax packet by asserting the transmit-confirm signal CONFIRM to the WiMax communication device 414. In step 510, the Bluetooth communication device 412 may receive a packet from the Bluetooth enabled headset 104, where the packet may have collided with the WiMax transmission in step 506. The Bluetooth communication device 412 may also have been communicated information that may indicate that the received Bluetooth packet may have been corrupted. Accordingly, the data from the Bluetooth packet, which may be corrupted, may be replaced with data that may indicate silence. This data may be placed in the WiMax packet for which the transmit request was made in step 500.

While an embodiment of the invention is described where the Bluetooth communication device 412 communicates data that indicates silence for a possibly corrupted packet, the invention need not be so limited. For example, a processor, such as, for example, the processor 211, the processor 214, and/or the processor 220 may communicate data that indicates silence, for example, zeros, to the WiMax communication device 414. Other embodiments of the invention may indicate to the WiMax communication device 414 to replace specific data from the Bluetooth communication device 412 with data that may indicate silence, where the specified data may correspond to the data from the Bluetooth packet that may have been corrupted.

Additionally, some embodiments of the invention may use packet loss concealment algorithms to generate data in place of data from Bluetooth packets that may have been corrupted. For example, in step 510, rather than replace possibly corrupted data with data that may indicate silence, packet loss concealment algorithms may be used where, for example, data from the last received packet may be repeated. Other packet loss concealment algorithms may, for example, use previous speech samples to generate speech data. The specific actions taken by a packet loss concealment algorithm may be design dependent.

It may be noted that this exemplary flow diagram may not cover all corner cases. For example, there may be cases where a received Bluetooth packet may comprise payload that may not be able to be transmitted in the WiMax packet for which transmit permission was just granted. Accordingly, data in such cases may need to be transmitted in a subsequent WiMax packet.

Figure 6:
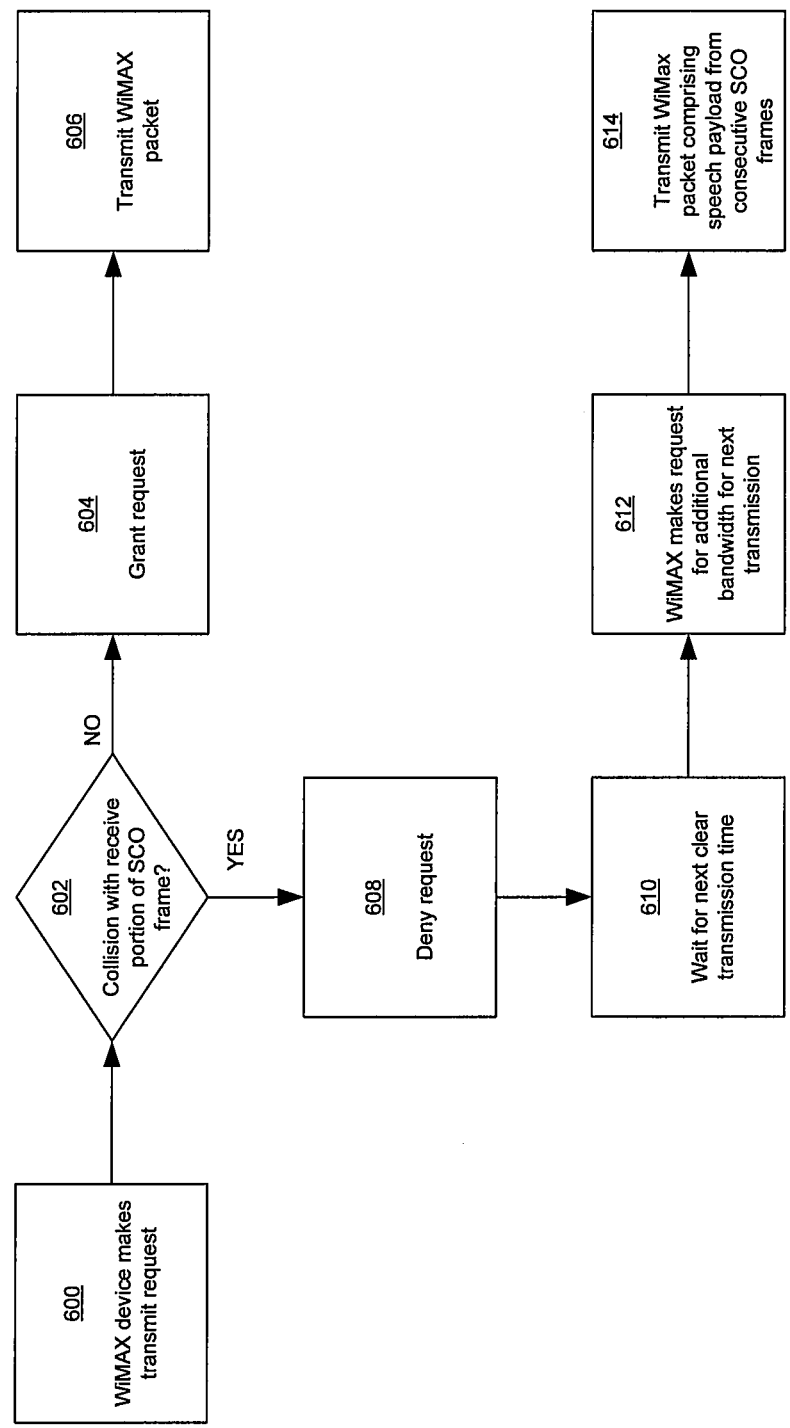
FIG. 6 is a flow diagram illustrating exemplary steps for handling an anticipated collision between a WiMax packet to be transmitted and a Bluetooth packet to be received, in accordance with an embodiment of the invention.

FIG. 6 is a flow diagram illustrating exemplary steps for handling an anticipated collision between a WiMax packet to be transmitted and a Bluetooth packet to be received, in accordance with an embodiment of the invention. Referring to FIG. 6, there is shown steps 600 to 612 for an exemplary scenario where the mobile terminal 102 may have established a VoIP connection via the WiMax base station 100. The mobile terminal 102 may also have established a Bluetooth SCO connection with, for example, the Bluetooth enabled headset 104. Accordingly, the voice data received from the WiMax base station 100 by the mobile terminal 102 may be communicated to the Bluetooth enabled headset 104, and vice versa.

In step 600, the WiMax communication device 414 may assert the transmission request signal REQUEST. The WiMax communication device 414 may also indicate, for example, via the status signal STATUS/TIMING when a packet may be transmitted and/or a priority of the packet. In step 602, the PTA 416 may determine, for example, whether allowing the WiMax communication device 414 to transmit may result in a collision with an incoming Bluetooth packet. If there is no predicted collision, the next step may be step 604. Otherwise, the next step may be step 608. In step 604, the PTA 416 may indicate to the WiMax communication device 414 that it may transmit by asserting the transmit-confirm signal CONFIRM. In step 606, the WiMax communication device 414 may transmit the WiMax packet, where the packet payload may comprise voice data from one or more previous Bluetooth packets transmitted by the Bluetooth enabled headset 104.

In step 608, the PTA 416 may indicate that the WiMax communication device 414 may not transmit by keeping deasserted the transmit-confirm signal CONFIRM to the WiMax communication device 414. Accordingly, a Bluetooth packet may be received without colliding with a WiMax packet being transmitted. The data from the Bluetooth packet may be processed and communicated to the WiMax communication device 414. The data from the presently received Bluetooth packet may be processed as part of a payload for a subsequent WiMax packet.

In step 610, the Bluetooth communication device 412 may make requests to transmit until it is granted permission to transmit. In step 612, the WiMax communication device 414 may initiate a request to the WiMax base station 100 for additional bandwidth for a WiMax transmission. In step 614, after receiving permission for additional bandwidth for the next WiMax transmission, the WiMax communication device 414 may transmit both the WiMax packet that was not transmitted due to denial of transmission request in step 608, and a subsequent WiMax packet using the additional bandwidth.

Figure 7:
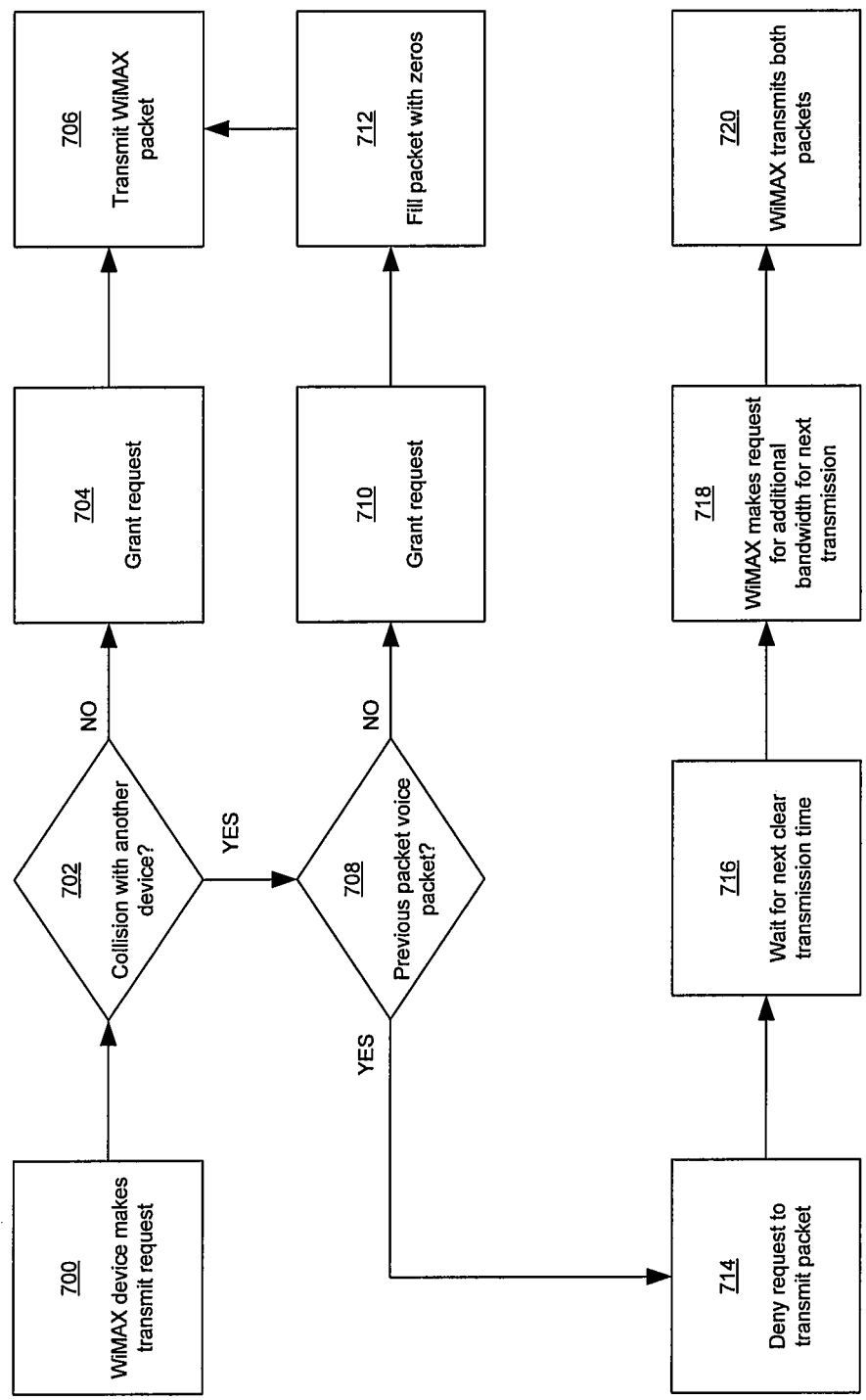
FIG. 7 is a flow diagram illustrating exemplary steps for handling an anticipated collision between a WiMax packet to be transmitted and a Bluetooth packet to be received, in accordance with an embodiment of the invention.

FIG. 7 is a flow diagram illustrating exemplary steps for handling an anticipated collision between a WiMax packet to be transmitted and a Bluetooth packet to be received, in accordance with an embodiment of the invention. Referring to FIG. 7, there is shown steps 700 to 720 for an exemplary scenario where the mobile terminal 102 may have established a VoIP connection via the WiMax base station 100. The mobile terminal 102 may also have established a Bluetooth SCO connection with, for example, the Bluetooth enabled headset 104. Accordingly, the voice data received from the WiMax base station 100 by the mobile terminal 102 may be communicated to the Bluetooth enabled headset 104, and vice versa.

In step 700, the WiMax communication device 414 may assert the transmission request signal REQUEST. The WiMax communication device 414 may also indicate, for example, via the status signal STATUS/TIMING when a packet may be transmitted and/or a priority of the packet. In step 702, the PTA 416 may determine, for example, whether transmission of a present WiMax packet may result in a collision with an incoming Bluetooth packet. If there is no predicted collision, the next step may be step 704. Otherwise, the next step may be step 708. In step 704, the PTA 416 may indicate to the WiMax communication device 414 that it may transmit a present WiMax packet by asserting the transmit-confirm signal CONFIRM. In step 706, the WiMax communication device 414 may transmit the present WiMax packet, where the packet payload may comprise voice data from one or more previous Bluetooth packets transmitted by the Bluetooth enabled headset 104.

In step 708, the PTA 416 may determine whether a previous packet received from the Bluetooth enabled headset 104 may comprise voice data. For example, the VAD 216a may determine whether the previous packet may comprise voice data, and this information may be communicated to the PTA 416. The VAD 216a may make this determination for each packet received from the Bluetooth communication device 412. For example, if the packet comprises information that indicates that the user of the Bluetooth enabled headset 104 may be silent, the VAD 216a may determine that the silence is not voice data. If the previous packet is determined to not comprise voice data, the next step may be step 710. Otherwise, the next step may be step 714.

In step 710, the PTA 416 may indicate to the WiMax communication device 414 that it may transmit the present WiMax packet by asserting the transmit-confirm signal CONFIRM. In step 712, the Bluetooth communication device 412 may communicate data that indicate silence, for example, zeros, to the WiMax communication device 414. The WiMax communication device 414 may then process the data as part of the present WiMax packet for which transmit permission was granted in step 710. The next step may be step 706 where the present WiMax packet may be transmitted.

In step 714, the PTA 416 may indicate to the WiMax communication device 414 that it may not transmit by keeping deasserted the transmit-confirm signal CONFIRM. Accordingly, a Bluetooth packet may be received without colliding with a WiMax packet being transmitted. The data from the Bluetooth packet may be processed and communicated to the WiMax communication device 414. The data from the presently received Bluetooth packet may be processed as part of a payload for a subsequent WiMax packet.

In step 716, the WiMax communication device 414 may make requests to transmit until it is granted permission to transmit. In step 718, the WiMax communication device 414 may request to the WiMax base station 100 for additional bandwidth for a WiMax transmission. In step 720, after receiving permission for additional bandwidth for the next WiMax transmission, the WiMax communication device 414 may transmit both the present WiMax packet that was not transmitted due to denial of transmission request in step 714, and a subsequent WiMax packet using the additional bandwidth.

Figure 8:
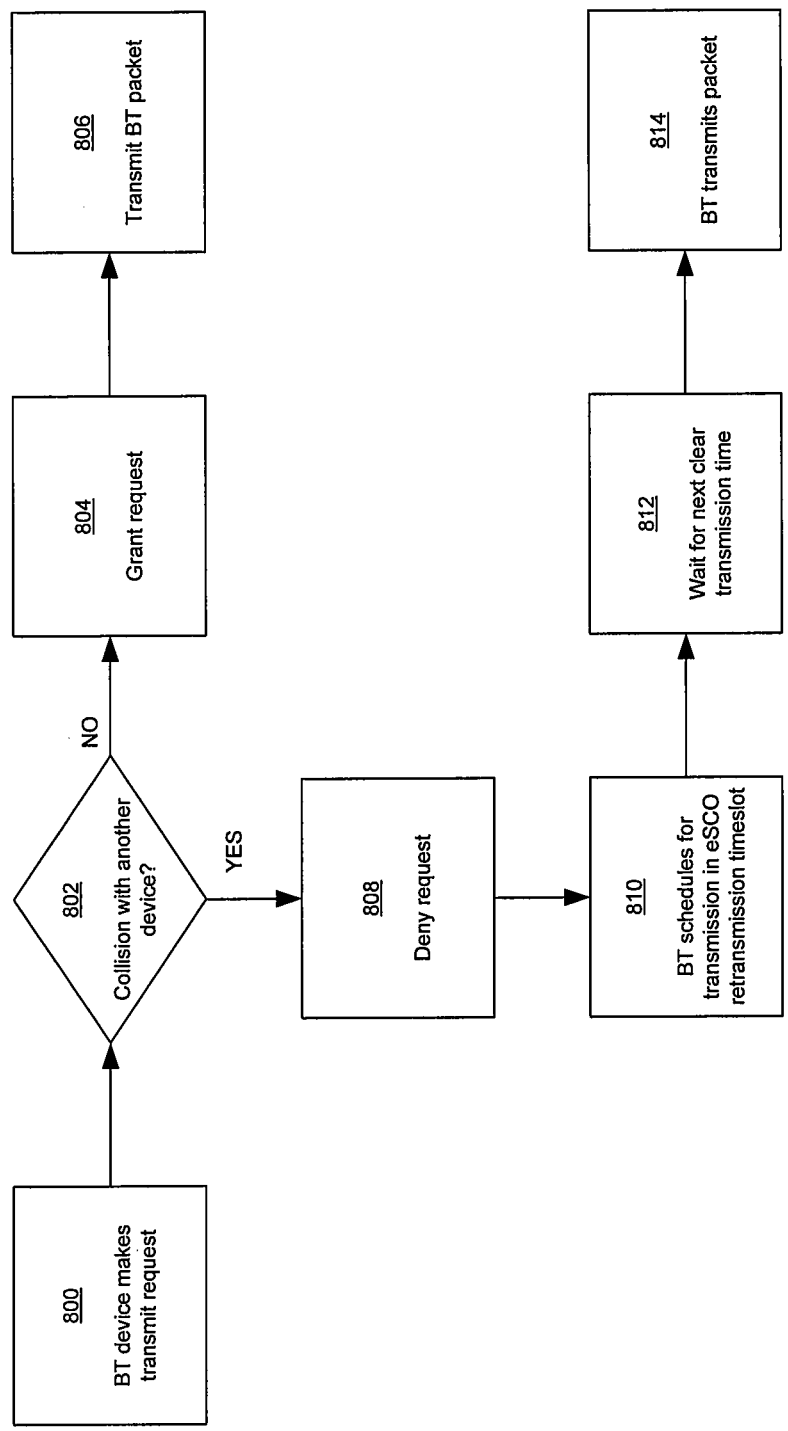
FIG. 8 is a flow diagram illustrating exemplary steps for handling an anticipated collision between a WiMax packet to be received and a Bluetooth packet to be transmitted, in accordance with an embodiment of the invention.

FIG. 8 is a flow diagram illustrating exemplary steps for handling an anticipated collision between a WiMax packet to be received and a Bluetooth packet to be transmitted, in accordance with an embodiment of the invention. Referring to FIG. 8, there is shown steps 800 to 814 for an exemplary scenario where the mobile terminal 102 may have established a VoIP connection via the WiMax base station 100. The mobile terminal 102 may also have established a Bluetooth eSCO connection with, for example, the Bluetooth enabled headset 104. Accordingly, the voice data received from the WiMax base station 100 by the mobile terminal 102 may be communicated to the Bluetooth enabled headset 104, and vice versa.

In step 800, the Bluetooth communication device 412 may assert the transmission request signal REQUEST. The Bluetooth communication device 412 may also indicate, for example, via the status signal STATUS/TIMING when a packet may be transmitted and/or a priority of the packet. In step 802, the PTA 416 may determine, for example, whether transmission of a Bluetooth packet may result in a collision with an incoming WiMax packet. If there is no predicted collision, the next step may be step 804. Otherwise, the next step may be step 808. In step 804, the PTA 416 may indicate to the Bluetooth communication device 412 that it may transmit a Bluetooth packet by asserting the transmit-confirm signal CONFIRM. In step 806, the Bluetooth communication device 412 may transmit the Bluetooth packet, where the packet payload may comprise a portion of voice data from a previous WiMax packet received from the WiMax base station 100.

In step 808, the PTA 416 may indicate to the Bluetooth communication device 412 that it may not transmit by keeping deasserted the transmit-confirm signal CONFIRM. Accordingly, a WiMax packet may be received without colliding with a Bluetooth packet. In step 810, the Bluetooth communication device 412 may prepare to transmit the Bluetooth packet, which was denied transmission in step 808, in a retransmission timeslot. In step 812, the Bluetooth communication device 412 may request permission to transmit to the PTA 416 by asserting the transmission request signal REQUEST. In step 814, after receiving permission to transmit, the Bluetooth communication device 412 may transmit Bluetooth packet that was not transmitted due to denial of transmission request in step 808.

Various embodiments of the invention may allow a Bluetooth device, for example, the Bluetooth communication device 412, to insert silence in place of packets that may not have been transmitted. Various embodiments of the invention may also use, for example, the packet loss concealment algorithm to replace the packets that may not have been transmitted.

Various embodiments of the invention may allow a Bluetooth device, for example, the Bluetooth communication device 412, to insert silence in place of packets that may not have been transmitted. Various embodiments of the invention may also use, for example, the packet loss concealment algorithm to replace the packets that may not have been transmitted.

In accordance with an exemplary embodiment of the invention, the mobile terminal 200 may comprise a plurality of collocated communication devices, such as, for example, the WLAN communication device 410, the Bluetooth communication device 412, the WiMax communication device 414. The mobile terminal 200 may also comprise the packet traffic arbiter (PTA) 416. The PTA 416 may enable prediction of whether transmission by one of the plurality of collocated communication devices will result in a collision with transmission and/or reception by another of the plurality of collocated communication devices.

The PTA 416 may arbitrate among the plurality of collocated communication devices that requested permission to transmit to grant permission to transmit to the collocated communication devices. The PTA 416 may, for example, grant permission to transmit based on collision predictions and transmit requests received from the collocated communication devices. The arbitration may also be based on, for example, a priority of the packet to be transmitted, where the priority may be based on the type of packet to be transmitted. The algorithm for arbitration may be design dependent. The permission to transmit may be granted to one or more of the collocated communication devices. The PTA 416 may also deny transmit requests to all of the collocated communication devices.

If there is no collision predicted, the PTA 416 may grant permission to transmit to, for example, the WiMax communication device 414, where the WiMax communication device 414 may transmit WiMax packets that may correspond to Bluetooth packets received by the Bluetooth communication device 412. For example, the WiMax communication device 414 may be used for a telephone call, and the Bluetooth communication device 412 may be used to communicate the telephone call to a Bluetooth headset, for example, the Bluetooth enabled headset 104. Accordingly, when a user speaks into the Bluetooth enabled headset 104, the Bluetooth enabled headset 104 may transmit packets that may be received by the Bluetooth communication device 412. The Bluetooth communication device 412 may then communicate the data from the received Bluetooth packet to the WiMax communication device 414. The WiMax communication device 414 may then communicate the data from the Bluetooth communication device 412 to the other party in the telephone call via a transmitted WiMax packet.

Various embodiments of the invention may use an algorithm that may grant permission to the WiMax communication device 414 to transmit a WiMax packet even if there is collision predicted with an incoming Bluetooth packet, the PTA 416. An incoming Bluetooth packet is one that is received by the Bluetooth communication device 412. The PTA 416 may then assume that the received Bluetooth packet is corrupted, and enable using data that indicates silence for the WiMax packet that corresponds to the assumed-to-be-corrupt Bluetooth packet.

Various embodiments of the invention may also use an algorithm where the PTA 416 may deny permission to transmit to the WiMax communication device 414 if a collision with an incoming Bluetooth packet is predicted. The WiMax communication device 416 may then make a request to the WiMax base station 100 to use a wider bandwidth for transmission at a next available WiMax transmission period. Upon receiving permission from the WiMax base station 100, the WiMax communication device 414 may transmit both the first WiMax packet which was denied permission to transmit and a second WiMax packet normally scheduled for transmission at this next available WiMax transmission period.

Various embodiments of the invention may also use another algorithm that may determine whether a received Bluetooth packet may comprise voice data. If the received Bluetooth packet is determined to not comprise voice data, the PTA 416 may grant permission to the WiMax communication device 414 to transmit a WiMax packet even if that may result in a collision with an incoming Bluetooth packet. The PTA 416 may enable placing data that indicates silence in a subsequent WiMax packet to be transmitted. The data that indicates silence in the subsequent WiMax packet may correspond to, for example, the data in the incoming Bluetooth packet.

However, if the received first Bluetooth packet is determined to comprise voice data, and if the PTA 416 predicts a collision with an incoming Bluetooth packet, the PTA 416 may deny permission to transmit by the WiMax communication device. The WiMax communication device 416 may then make a request to the WiMax base station 100 to use a wider bandwidth for transmission at a next available WiMax transmission period. Upon receiving permission from the WiMax base station 100, the WiMax communication device 414 may transmit both the first WiMax packet which was denied permission to transmit and a second WiMax packet normally scheduled for transmission at this next available WiMax transmission period.

Another embodiment of the invention may provide a machine-readable storage, having stored thereon, a computer program having at least one code section executable by a machine, thereby causing the machine to perform the steps as described herein for collaborative coexistence of Bluetooth and WiMax.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for wireless communication, the method comprising:
   in a mobile terminal, predicting whether transmission by one of a plurality of collocated communication devices will result in a collision with transmission or reception by another of said plurality of collocated communication devices, wherein said plurality of collocated communication devices comprises a WLAN communication device, a broadband wireless technology communication device and a Bluetooth communication device;
   arbitrating among said plurality of collocated communication devices to grant permission to transmit, based on both of said predicting and previous data received by one or more of said plurality of collocated communication devices;
   wherein said arbitrating includes choosing to either grant permission to the broadband wireless technology communication device to transmit responsive to the transmission being predicted to result in a collision with reception of data by the Bluetooth communication device and responsive to the previous data received by the Bluetooth communication device being non-voice data; or deny permission to the broadband wireless technology communication device to transmit responsive to the transmission being predicted to result in a collision with reception of data by the Bluetooth communication device and responsive to the previous data received by the Bluetooth communication device being voice data.

2. The method according to claim 1, wherein said permission to transmit is granted to a subset of said plurality of collocated communication devices, wherein said subset of said plurality of collocated communication devices comprises a range from none of said plurality of collocated communication devices to all of said plurality of collocated communication devices.

3. The method according to claim 1, wherein said arbitrating is based on priorities assigned to a type of packet to be transmitted by said plurality of collocated communication devices from which one or more transmit requests are received.

4. The method according to claim 1, comprising granting to one of said plurality of collocated communication devices, permission to transmit a first packet if a second packet is not predicted to be received by another of said plurality of collocated communication devices during a period of time when said first packet is transmitted.

5. The method according to claim 1, comprising receiving one or more transmit requests from said broadband wireless technology communication device, wherein said broadband wireless technology communication device transmits broadband wireless technology packets that correspond to one or more received Bluetooth packets.

6. The method according to claim 5, comprising granting permission to said broadband wireless technology communication device, to transmit a first broadband wireless technology packet.

7. The method according to claim 6, comprising, if a first Bluetooth packet is predicted to be received by said Bluetooth communication device during a period of time when said first broadband wireless technology packet is to be transmitted, transmitting a second broadband wireless technology packet after said first broadband wireless technology packet is transmitted, wherein said second broadband wireless technology packet comprises data that indicate silence, wherein said second broadband wireless technology packet corresponds to said first Bluetooth packet, and wherein the previous data received by the Bluetooth communication device is non-voice data.

8. The method according to claim 5, comprising, if a Bluetooth packet is predicted to be received by said Bluetooth communication device during a period of time when a first broadband wireless technology packet is to be transmitted, denying permission to said broadband wireless technology communication device to transmit said first broadband wireless technology packet, wherein the previous data received by the Bluetooth communication device is voice data.

9. The method according to claim 8, comprising making a request to a broadband wireless technology base station, by said broadband wireless technology communication device, to use a wider bandwidth for transmission at a next available broadband wireless technology transmission period for said broadband wireless technology communication device.

10. The method according to claim 9, comprising, if permission to use said wider bandwidth is received from said broadband wireless technology base station, transmitting both said first broadband wireless technology packet and a second broadband wireless technology packet, by said broadband wireless technology communication device at said next available broadband wireless technology transmission period utilizing said wider bandwidth.

11. The method according to claim 1, wherein said broadband wireless technology communication device transmits broadband wireless technology packets that correspond to one or more received Bluetooth packets.

12. The method according to claim 1, wherein said broadband wireless technology comprises WiMAX technology.

13. A system for wireless communication, the system comprising:
one or more circuits in a mobile terminal comprising a plurality of collocated communication devices that enables prediction of whether transmission by one of said plurality of collocated communication devices will result in a collision with transmission and/or reception by another of said plurality of collocated communication devices, wherein said plurality of collocated communication devices comprises a WLAN communication device, a broadband wireless technology communication device and a Bluetooth communication device; and
said one or more circuits enable arbitrating among said plurality of collocated communication devices to grant permission to transmit, based on one or both of said predicting and previous data received by one or more of said plurality of collocated communication devices;
wherein said arbitrating includes choosing to either grant permission to the broadband wireless technology communication device to transmit responsive to the transmission being predicted to result in a collision with reception of data by the Bluetooth communication device and responsive to the previous data received by the Bluetooth communication device being non-voice data; or deny permission to the broadband wireless technology communication device to transmit responsive to the transmission being predicted to result in a collision with reception of data by the Bluetooth communication device and responsive to the previous data received by the Bluetooth communication device being voice data.

14. The system according to claim 13, wherein said permission to transmit is granted to a subset of said plurality of collocated communication devices, wherein said subset of said plurality of collocated communication devices comprises a range from none of said plurality of collocated communication devices to all of said plurality of collocated communication devices.

15. The system according to claim 13, wherein said arbitrating is based on priorities assigned to a type of packet to be transmitted by said plurality of collocated communication devices from which said one or more transmit requests are received.

16. The system according to claim 13, wherein said one or more circuits enable granting to one of said plurality of collocated communication devices, permission to transmit a first packet, if a second packet is not predicted to be received by another of said plurality of collocated communication devices during a period of time when said first packet is transmitted.

17. The system according to claim 13, wherein said one or more circuits enable reception of one or more transmit requests from said broadband wireless technology communication device, and wherein said broadband wireless technology communication device transmits broadband wireless technology packets that correspond to one or more received Bluetooth packets.

18. The system according to claim 17, wherein said one or more circuits enable granting of permission to said broadband wireless technology communication device to transmit a first broadband wireless technology packet.

19. The system according to claim 18, wherein said one or more circuits enable transmission of a second broadband wireless technology packet after said first broadband wireless technology packet is transmitted, if a first Bluetooth packet is predicted to be received by said Bluetooth communication device during a period of time when said first broadband wireless technology packet is to be transmitted, wherein said second broadband wireless technology packet corresponds to said first Bluetooth packet and wherein said second broadband wireless technology packet comprises data that indicate silence, and wherein the previous data received by the Bluetooth communication device is non-voice data.

20. The system according to claim 18, wherein said one or more circuits enable denying permission to said broadband wireless technology communication device to transmit said first broadband wireless technology packet, if a Bluetooth packet is predicted to be received by said Bluetooth communication device during a period of time when a first broadband wireless technology packet is to be transmitted, wherein the previous data received by the Bluetooth communication device is voice data.

21. The system according to claim 20, wherein said broadband wireless technology communication device is configured to transmit the request for additional bandwidth to a broadband wireless technology base station.

22. The system according to claim 21, wherein said broadband wireless technology communication device enables transmission of both said packet associated with said denied transmission and said next packet, if permission to use said additional bandwidth is received from said broadband wireless technology base station.

23. The system according to claim 13, wherein said broadband wireless technology communication device transmits broadband wireless technology packets that correspond to one or more received Bluetooth packets.

24. The system according to claim 13, wherein said broadband wireless technology comprises WiMAX technology.

* * * * *